United States Patent

Hosoi et al.

[11] Patent Number: 5,768,948
[45] Date of Patent: Jun. 23, 1998

[54] STEERING WHEEL

[75] Inventors: Akio Hosoi, Komaki; Atsushi Nagata, Inazawa; Tooru Koyama, Nishikasugai-gun, all of Japan

[73] Assignee: Toyoda Gosei Co., Ltd., Aichi, Japan

[21] Appl. No.: 728,902

[22] Filed: Oct. 10, 1996

[30] Foreign Application Priority Data

Oct. 11, 1995 [JP] Japan .................................... 7-263216

[51] Int. Cl.$^6$ ..................................................... B62D 1/04
[52] U.S. Cl. ......................................... 74/552; 280/728.2
[58] Field of Search ........................... 74/552; 280/728.2, 280/731, 728.1

[56] References Cited

U.S. PATENT DOCUMENTS

| | | | |
|---|---|---|---|
| 4,541,299 | 9/1985 | Kanaya et al. ............................. | 74/493 |
| 4,561,324 | 12/1985 | Hiramitsu et al. ........................ | 74/498 |
| 4,574,653 | 3/1986 | Hiramitsu et al. ..................... | 74/484 R |
| 4,630,501 | 12/1986 | Kubota et al. ........................ | 74/552 X |
| 4,667,529 | 5/1987 | Ono et al. .............................. | 74/552 X |
| 5,584,501 | 12/1996 | Walters ................................ | 280/728.2 |

FOREIGN PATENT DOCUMENTS

| | | | |
|---|---|---|---|
| 2-34468 | 2/1990 | Japan ....................................... | 74/552 |
| 2-133955 | 11/1990 | Japan . | |
| 350693 | 6/1931 | United Kingdom ..................... | 74/552 |

*Primary Examiner*—Vinh T. Luong
*Attorney, Agent, or Firm*—Cushman Darby & Cushman, IP Group of Pillsbury Madison & Sutro, LLP

[57] ABSTRACT

A steering wheel assembly in which a main body is slidably connected to a boss for connecting the steering wheel onto a steering shaft. The steering wheel main body has a connecting plate with a pair of tapered guide rails that will slidably receive a hooking portion therein. When the hooking portion is inserted into the guide rails, the position of the steering wheel main body is defined at a desired position relative to the shaft.

5 Claims, 4 Drawing Sheets

STEERING WHEEL

The following priority application, Japanese Patent Application No. hei 7-263216, filed in Japan on Oct. 11, 1995, is hereby incorporated by reference into the present specification.

BACKGROUND OF THE INVENTION

1. Field of the Invention

This invention relates to a steering wheel, and more particularly to the steering wheel structure mounted on an automobile.

2. Description of Related Art

A conventional steering wheel comprises a ring portion, a pad portion located at the center of the ring portion, and spoke portions that inter-connect the ring and pad portions. The ring portion has a ring core. The spoke portions have spoke cores. The ring core and spoke cores are conventionally covered with a molded covering material such as polyurethane. The spoke cores are connected with a boss which is, in turn, connected to a steering shaft.

It has been suggested that a steering wheel can be formed with an integral pad and covering portion, for example, as shown in Japanese Utility Model laid Open No. hei 2-133955.

Manufacturers prefer to use steering wheels with an integrally formed pad and covering portion, so that the look, styling or design of the steering wheel is improved.

However, this type of integrally formed steering wheel is difficult to mount on the steering shaft since the steering wheel cannot be removed or separated from the pad and the covering portion. Therefore, when the boss plate is connected to spoke cores, it is difficult to fasten a nut to the boss plate from above.

Therefore, it is desirable to have a steering wheel that is easily and securely mounted to a steering shaft by a convenient connection between the boss plate and spoke cores.

SUMMARY OF THE INVENTION

An object of the present invention is to provide a steering wheel, formed with an integral pad and a covering portion, which is mounted on a steering shaft easily and securely.

A steering wheel according to the present invention comprises a steering wheel main body and a boss portion. The steering wheel main body has a ring core, spoke cores, a covering portion extending over the ring core and spoke cores, and an integrally formed pad portion. The steering wheel main body also has a connecting portion, which in a preferred embodiment includes a connecting plate, having a guide rail.

The boss portion is provided with a fixed portion, which in a preferred embodiment includes a serrated area for receipt of a mating serrated end portion of the steering shaft. The boss is also formed with an engaging portion, that will couple with the guide rail. After the guide rail and the engaging portion come into contact, a fastener will fix and secure the connection between the boss portion and the connecting portion.

The boss portion is then fixed on the end of the steering shaft and the guide rail of the connecting plate is coupled to the engaging portion of the boss. The engaging portion is formed with a shape that is substantially similar to the inside shape or configuration of the guide rail such that a portion of the engaging portion removably interfits with the connecting portion. Therefore, the steering wheel main body is defined at a preferable position. Finally, when the guide rail fully receives the engaging portion, a fastener locks the boss and connecting portions together. The steering wheel main body is fixed to the boss portion through this connection.

Therefore, the steering wheel can be easily and certainly attached to the steering shaft.

DETAILED DESCRIPTION OF THE PREFERRED EMBODIMENT

Figure 1:
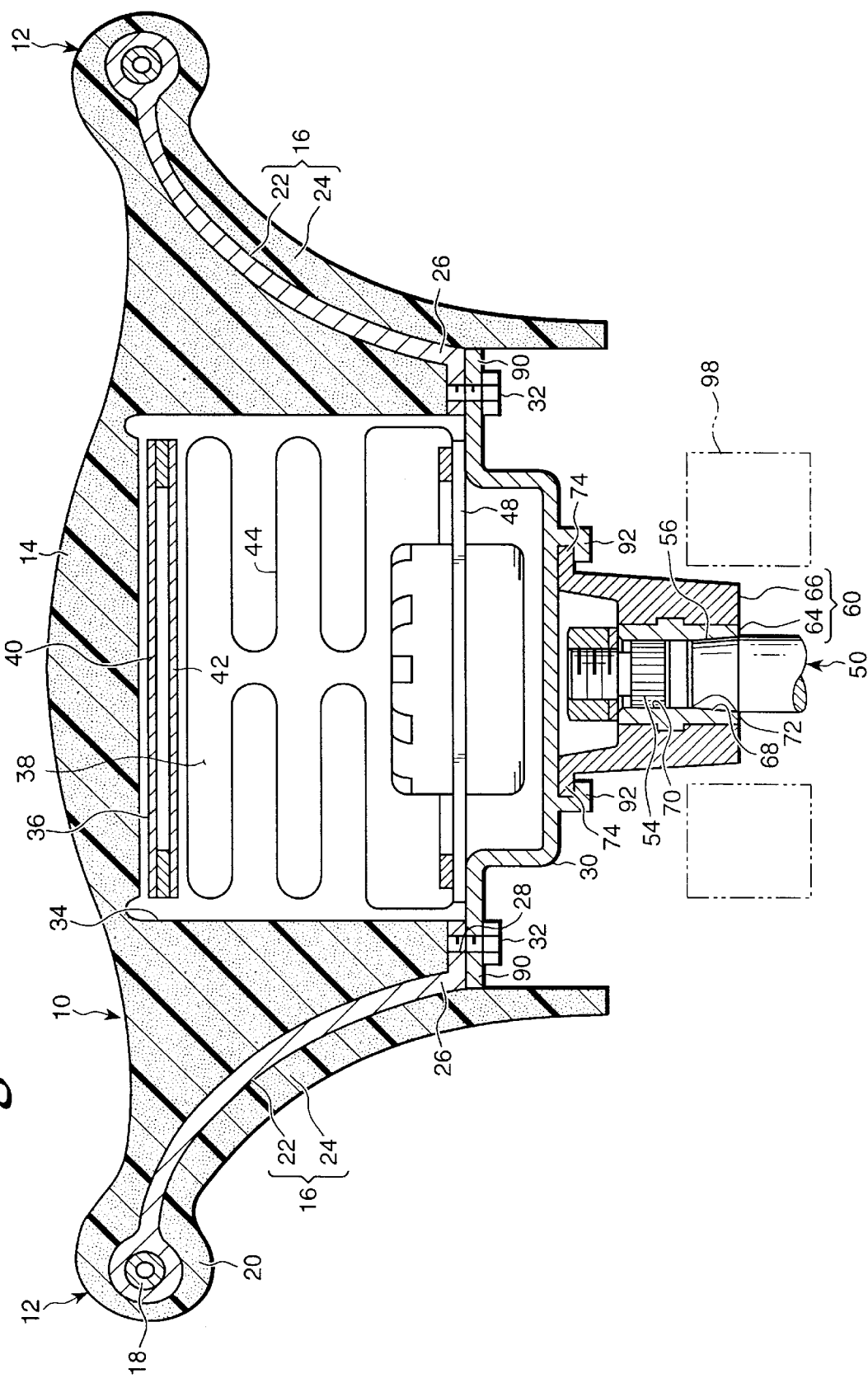
FIG. 1 is a cross-sectional view of an embodiment of a steering wheel, taken along line I—I of FIG. 2.

The steering wheel main body 10 of a steering wheel comprises a ring portion 12, a pad portion 14, located at the center of the ring portion 12, and four spoke portions 16, connected between the ring portion 12 and the pad portion 14. The ring portion 12 includes a ring core 18 made of steel tubing and a covering portion 20 covering the ring core 18. Each spoke portion 16 has a separate spoke core 22, for example made of aluminum, that is suitably connected to ring core 18, with covering portions 24 covering the spoke cores 22. The covering portions 20, 22 and the pad portion 14 are made of relatively soft, sponge type polyurethane.

As shown in FIG. 1, the spoke cores 22 extend from the ring core 18 downwardly with a lower end of the spoke cores 22 being formed with flat portions 26 that include a threaded hole 28. A connecting plate 30 is fixed to the flat portions 26 by screws 32.

An air bag stowing portion 34, surrounded by the covering portion 24, is formed under the pad portion 14. A conventional membrane switch 36 and an air bag device 38 are located in the stowing portion 34. The membrane switch 36 comprises an upper thin plate 40 and a lower thin plate 42. When the pad portion 14 is pushed, thin plates 40 and 42 will be moved to contact each other and thereby complete an electrical circuit activating the horn.

The air bag device 38 includes a folded air bag 44 and an inflator 46 for generating gas to deploy the air bag. The inflator 46 has a flange portion 48 conventionally fixed to the connecting plate 30 by bolts or screws (not shown).

Figure 3:
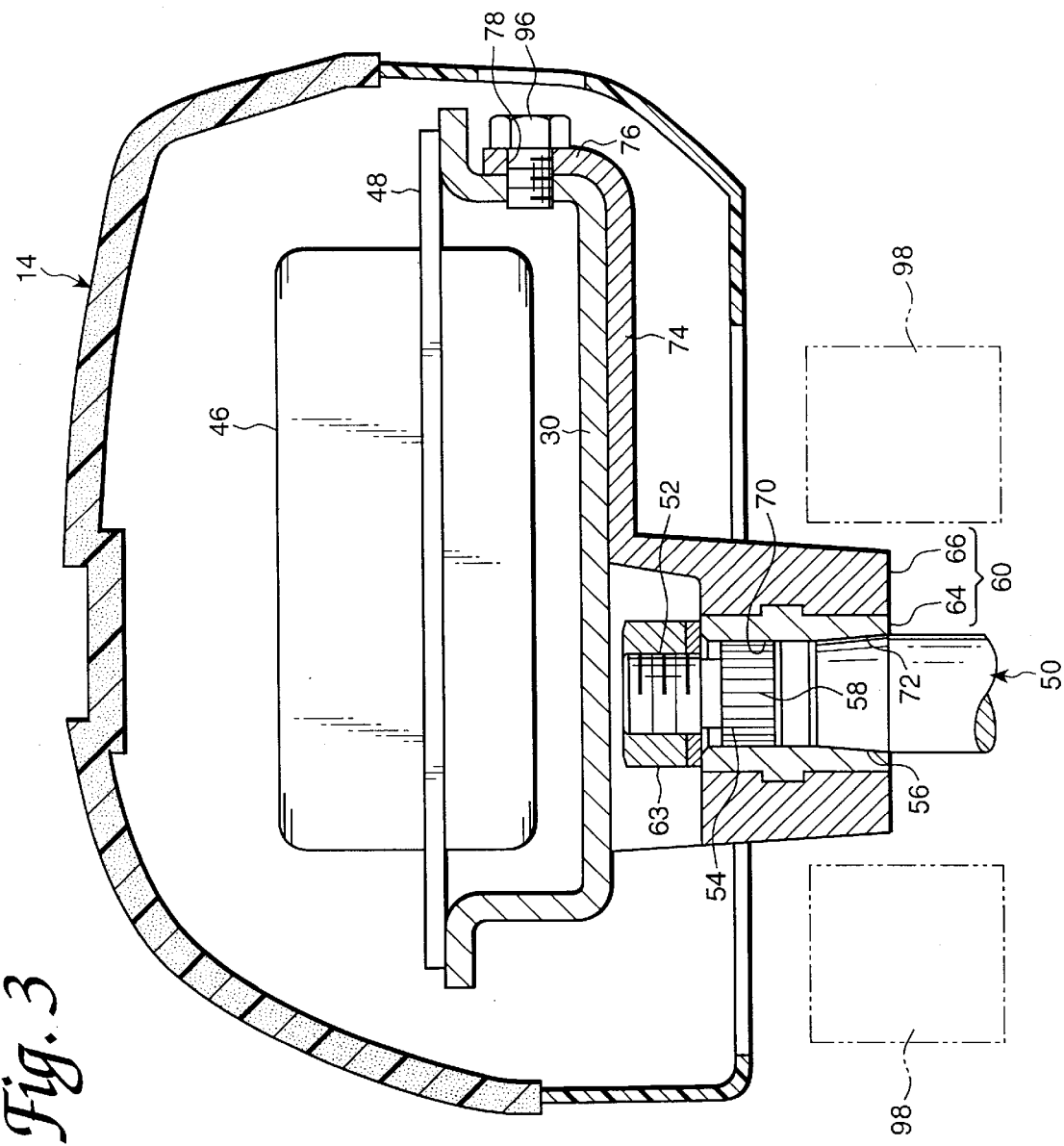
FIG. 3 is a cross-sectional view of the steering wheel, taken along line III—III of FIG. 2.
Figure 4:
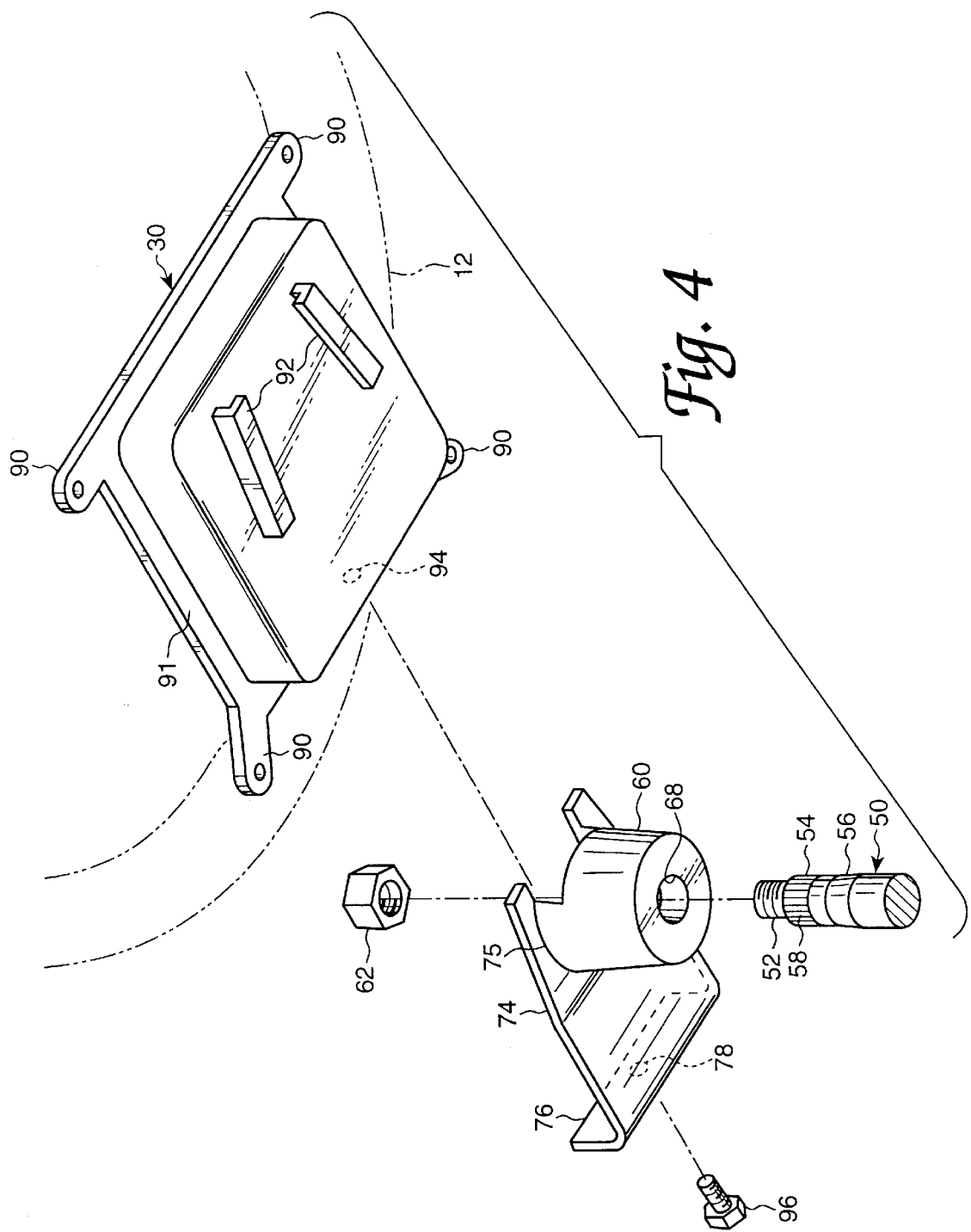
FIG. 4 is an exploded view of a connecting plate and a boss portion.

As shown in FIGS. 1, 3 and 4, a threaded portion 52 is formed at the upper end of a steering shaft 50. Steering shaft 50 also includes a serrated area 54 with the portion therebelow being tapered as shown at 56. The serrated area 54 has about thirty vertically oriented teeth 58 but the precise number is not critical. The top end of the steering shaft 50 is inserted into and through boss 60 with the two structures being fixed together by a nut 62.

The boss 60 includes an interior portion 64, preferably formed from steel, and an outer portion 66, preferably of aluminum, formed about interior portion 64. The boss 60 is substantially cylindrically shaped. The interior portion 64 includes a central bore 68 that is provided with a serrated area 70, corresponding to the serrated area 54 of the steering shaft 50, and a tapered portion 72, corresponding to the tapered portion 56 of the steering shaft 50. As best shown in FIG. 4, the upper end of boss 60 includes a plate like engaging portion 74 formed with a narrowed front portion 75 and a rear, upwardly extending stopper portion or wall 76. The front portion 75 removably interfits with the connecting portion. The stopper portion 76 is provided with a hole 78 substantially at its center.

The connecting plate 30 is a substantially box-shaped member and has four outwardly extending wing portions 90, that extend from a flange 91 formed about the upper end. A pair of L-shaped guide rails 92 are located on and depend from the bottom surface of plate 30. A threaded hole 94 is provided on the back side wall 93 at a position corresponding to hole 78 of stopper portion 76. The four wing portions 90 are connected to the end of four spoke core 22 by fastening screw 32. Also, the pair of guide rails 92 are conformed to slidably receive to the engaging portion 74.

Figure 2:
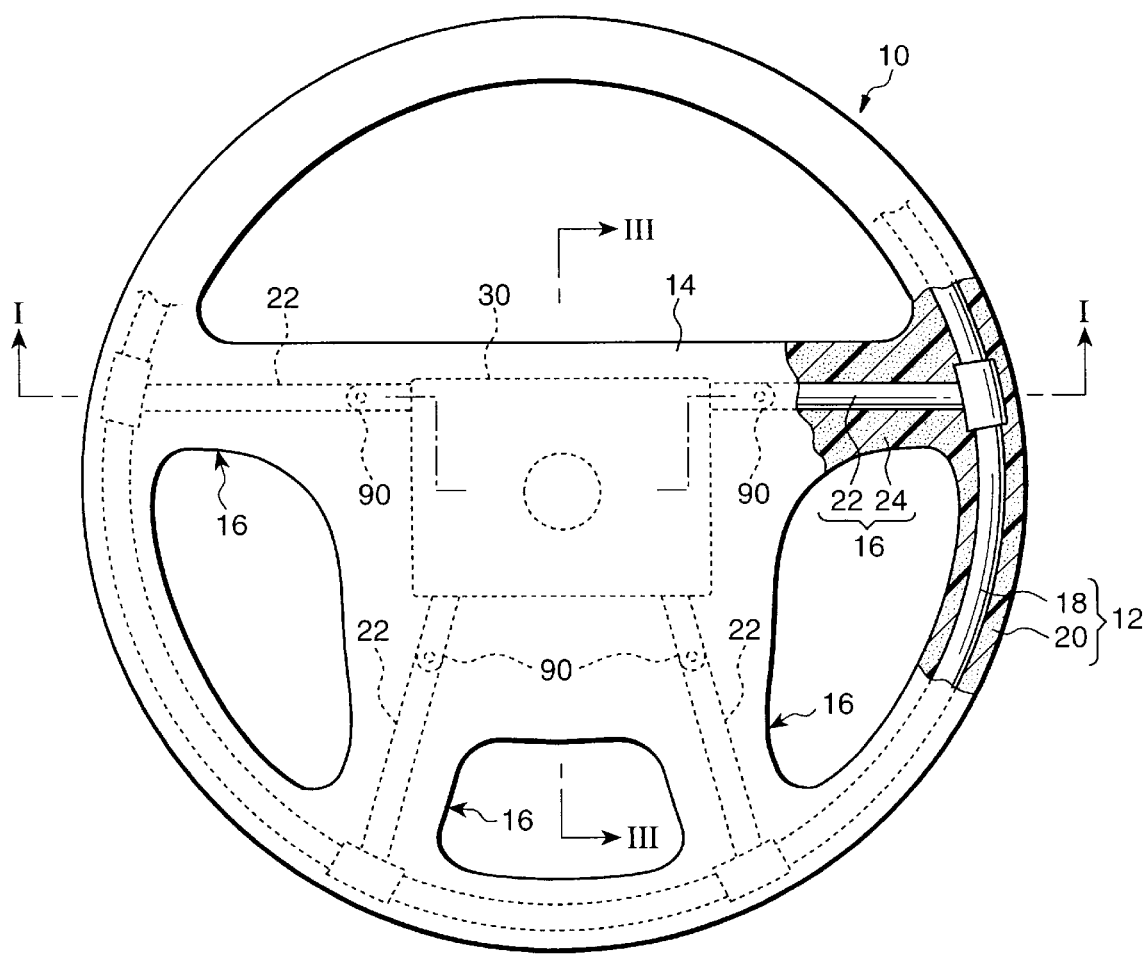
FIG. 2 is an elevational view of a steering wheel.

When the engaging portion 74 is inserted into the pair of guide rails 92, by a sliding motion, holes 94 and 78 will become axially aligned which permits the stopper portion 76 to be fixed against side wall 91 by a screw 96 as shown in FIG. 3. A spiral cable 98 for electrically connecting the air bag device to conventional sensors is located outside the steering shaft 50 as shown in FIGS. 2 and 3.

The process of installing the steering wheel onto the steering shaft 50 is as follows: the membrane switch 36 and the air bag device 38 will already have been installed in the steering wheel main body 10 and the connecting plate 30 will have been fixed on the spoke core 22, prior to this point of installing the steering wheel on the steering shaft 50.

The boss 60 is inserted over the end of the steering shaft 50 to interengage the serrated area 54 of the steering shaft 50 with the serrated area 70 of the boss 60. Then, the nut 62 is screwed to the screw portion 52 of the steering shaft 50 thereby fixing boss 60 onto the steering shaft 50.

Next, the pair of tapered guide rails 92 of the connecting plate 30 are slid over and onto the engaging portion 74 of the boss 60. This is simplified by the tapered narrow front side of engaging portion 74. When the guide rails 92 have fully received the engaging portion 74 at a desired position, the inside surfaces of the guide rail 92 will be in contact with the side edges of the engaging portion 74. At this time, the stopper portion 76 will also be in contact with the rear side wall 91 of the connecting plate 30. Therefore, the relative position between the connecting plate 30 and boss 60 is controlled.

Then, a screw 96, or other fastening device, is inserted into the aligned holes 76 and 96 thereby fastening plate 30 to boss 60. In addition, the engaging portion 74 will be fully pushed into guide rails 92 by the tightening of screw 96. Therefore, the connecting plate 30 is well secured to boss 60.

The guide rails 92 taper slightly so that the rear opening is wider than the front side opening. The shape of the engaging portion 74 corresponds to the inside shape of the guide rails 92. Thus, when the engaging portion 74 is inserted into the guide rails 92, the position of the steering wheel main body 10 is automatically defined on shaft 50. When the connecting plate 30 and the boss 60 are fastened together, the steering wheel will have been mounted on the steering shaft 50 in an easy and certain manner.

In addition, when the engaging portion 74 is inserted into the guide rails 92, the stopper 76 will contact the connecting plate 30. Consequently, the position between the connecting plate 30 and the boss 60 is defined and controlled from three directions. As a result, this steering wheel is prevented from rattling and coming off from the steering shaft 50.

Also, use of screw 96 between the connecting plate 30 and the boss 60 allows the steering wheel to be mounted on the steering shaft 50 with an improved and lower cost process.

This type of connection between the engaging portion 74, of boss 60 and the connecting portion 30 will not interfere with the operation of a spiral cable 98, shown in FIGS. 1 and 3, which provides an electrical connection to the air bag device. Cable 98 is located outside of the steering shaft 50, but the steering wheel main body 20 can be easily mounted on the steering shaft 50 without any effect on the spiral cable 98.

Another embodiment of this invention would be to use an energy absorbent device, instead of air bag device 38, in the steering wheel main body 10.

What is claimed is:

1. A steering wheel comprising:
   a steering wheel main body having a connecting portion fixed thereto; and
   a boss member having a fixed portion configured to be secured to a steering shaft, and an engaging portion that removably interfits with said connecting portion,
   wherein said connecting portion includes a pair of guide rails attached to and depending from said connecting portion, said engaging portion being slidably retained in said guide rails, and wherein said guide rails taper toward one another from one end to another end.

2. A steering wheel according to claim 1, wherein said boss further includes a stopper member.

3. A steering wheel according to claim 2, wherein said stopper member and said connecting portion are fastened together.

4. A steering wheel according to claim 2, wherein said stopper member is positioned on said boss at a location spaced from the engaging portion interfitting with said connecting portion.

5. A steering wheel according to claim 4, wherein said stopper member comprises a bent wall that will contact a surface of said connecting portion.

* * * * *